T. ARNOLD.
PRODUCTION OF GAS FOR PRODUCING LIGHT AND HEAT.
No. 49,358. Patented Aug. 15, 1865.
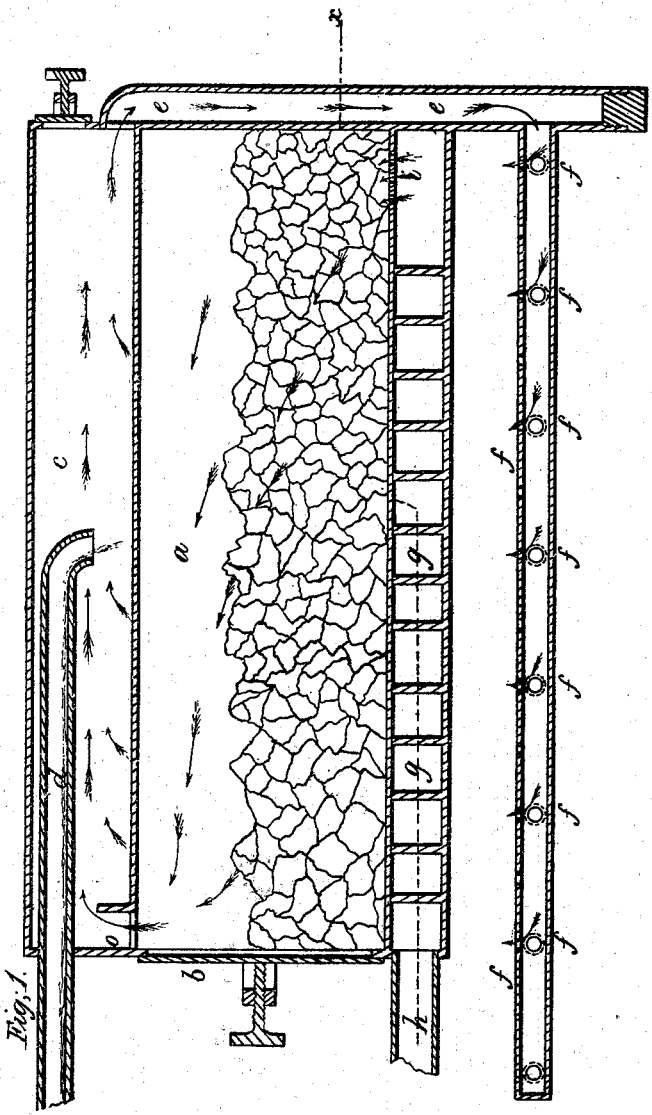
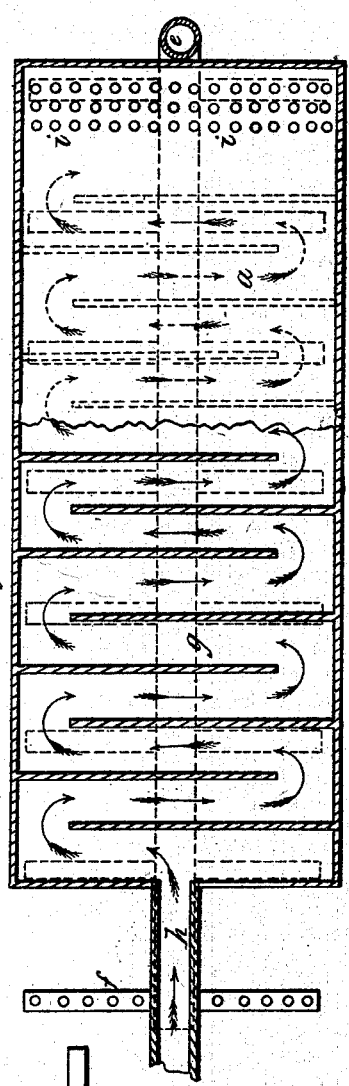
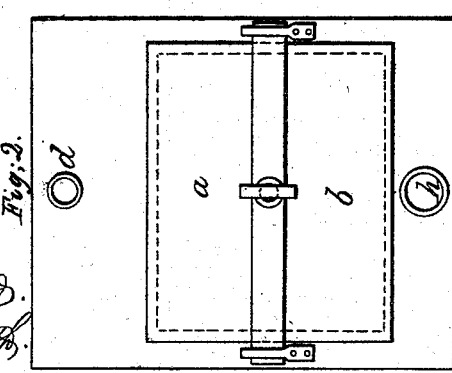
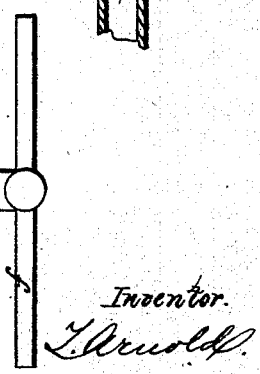
Witnesses.
Inventor.

UNITED STATES PATENT OFFICE.

THOMAS ARNOLD, OF NEW YORK, N. Y.

IMPROVEMENT IN THE MANUFACTURE OF GAS FOR HEATING AND ILLUMINATING BUILDINGS AND FOR OTHER PURPOSES.

Specification forming part of Letters Patent No. 49,358, dated August 15, 1865.

*To all whom it may concern:*

Be it known that I, THOMAS ARNOLD, of the city and State of New York, have invented and made a certain new and useful Improvement in the Production of Gases for Producing Light and Heat; and I do hereby declare the following to be a full, clear, and exact description of the said invention, reference being had to the annexed drawings, making part of this specification, wherein—

Figure 1 is a longitudinal section of my apparatus for producing gas. Fig. 2 is an end view of the same, and Fig. 3 is a sectional plan at the line $x\ x$ of Fig. 1.

Similar marks of reference denote the same parts.

My invention has for its object the production of a gas that can be advantageously employed for steam or other boilers as generators or for general heating purposes, and at the same time the gas that is not used for the production of heat may be employed for illumination.

I make use of an apparatus in which three operations are performed, all conspiring to the end in view: First, steam is superheated as it passes into and through the apparatus; second, the steam is deprived of its oxygen by being passed through incandescent carbonaceous material; and, third, the hydrogen is caused to combine with the vapors of hydrocarbon liquid—such as petroleum—introduced into the apparatus. The gases resulting from these operations are highly inflammable, and produce an intense heat that is employed in keeping the apparatus itself sufficiently hot, and also in heating a steam-boiler in which said apparatus may be placed; or the said apparatus may be used for cooking, heating buildings, or under any other circumstances where heat is required; or the gases not required for heating may be conveyed away and used for illumination.

In the drawings, $a$ is a retort, into which incandescent coals are introduced by a scoop or other device, after which the door $b$ is to be tightly closed.

$c$ is a chamber above the retort $a$, into which petroleum or any other hydrocarbon is to be introduced through a pipe, $d$, and allowed to run in a regulated quantity upon the heated upper side of the retort. The gaseous products evolved pass by the pipe $e$ to the range of burners $f$ beneath the apparatus, and maintain a sufficient heat in the same. I prefer that these burners be circular, or of the character known as "Argand" burners.

The bottom of the retort $a$ is made hollow to form a superheating steam-space, $g$, to which steam is supplied by the pipe $h$ in a regulated quantity. In this steam-space are partitions extending alternately from opposite sides, so that the steam has to travel through a zigzag or tortuous passage and becomes highly superheated. It then passes through perforations or openings at $i$, through the retort, mingling with the incandescent fuel, which deprives it of the oxygen, and thence the hydrogen passes from the opening $o$ into the space, where it commingles with the hydrocarbon vapors and forms a gas possessing great heating properties, and goes off, as before stated, to be consumed and produce a great body of flame for heating purposes.

I remark that where but little steam is introduced the illuminating power will be increased; but a large amount of steam can be used to advantage where heat only is required.

What I claim, and desire to secure by Letters Patent, is—

1. A gas-generating apparatus in which superheated steam is passed through incandescent carbon and thence through a chamber immediately over the carbon, into which petroleum or other hydrocarbon is admitted, and the gaseous products conveyed away and burned below such apparatus, as specified.

2. The arrangement of the steam-passages $g$, carbon-chamber $a$, chamber $c$, and pipes $e f$, for the purposes and as specified.

In witness whereof I have hereunto set my signature this 12th day of April, A. D. 1865.

T. ARNOLD.

Witnesses:
THOS. GEO. HAWED,
CHAS. H. SMITH.